United States Patent [19]

Sundet

[11] Patent Number: 4,626,468

[45] Date of Patent: Dec. 2, 1986

[54] MICROPOROUS SUPPORT LAYER WITH INTERFACIALLY POLYMERIZED COPOLYAMIDE THEREON

[75] Inventor: Sherman A. Sundet, Wilmington, Del.

[73] Assignee: E. I. Du Pont de Nemours and Company, Wilmington, Del.

[21] Appl. No.: 854,928

[22] Filed: Apr. 23, 1986

[51] Int. Cl.$^4$ .............................................. B32B 3/26
[52] U.S. Cl. ........................... 428/315.5; 210/500.38; 210/654; 428/420
[58] Field of Search ........................... 210/500.2, 654; 428/315.5, 315.7, 315.9, 420

[56] References Cited

U.S. PATENT DOCUMENTS

| | | | |
|---|---|---|---|
| 3,567,632 | 3/1971 | Richter et al. | 210/500.2 |
| 3,649,687 | 3/1972 | Weyland et al. | 260/544 L |
| 3,744,642 | 7/1973 | Scala et al. | 210/500.21 |
| 4,277,344 | 7/1981 | Cadotte | 210/500.2 |
| 4,353,802 | 10/1982 | Hara et al. | 210/500.2 |
| 4,520,044 | 5/1985 | Sundet | 210/500.2 |
| 4,529,646 | 7/1985 | Sundet | 210/500.2 |

*Primary Examiner*—William J. Van Balen

[57] ABSTRACT

Composite reverse osmosis membranes are disclosed wherein a microporous support layer has superposed thereon an interfacially polymerized aromatic copolyamide. The aromatic copolyamide is derived from metaphenylene diamine and, based on polymerized acid chloride present, 10 to 80% by weight repeating units derived from trimesoyl chloride, from 90 to 15% by weight repeating units derived from cyclohexane-1,3,5-tricarbonyl chloride and up to 40% by weight, repeating units derived from isophthaloyl chloride, terephthaloyl chloride or mixtures thereof. The membranes exhibit improved flux over similar membranes based on trimesoyl chloride while retaining similar salt rejection ability. The membranes containing the diacids exhibit improved flux over similar membranes based on the two triacid chlorides while retaining similar salt rejection ability.

3 Claims, No Drawings

MICROPOROUS SUPPORT LAYER WITH INTERFACIALLY POLYMERIZED COPOLYAMIDE THEREON

FIELD OF THE INVENTION

The present invention relates to composite membranes suitable for use in reverse osmosis processes such as the desalination of aqueous solutions. More particularly the present invention relates to a multilayer membrane in which one layer is a copolymer of meta-phenylene diamine with cyclohexane-1,3,5-tricarbonyl chloride, trimesoyl chloride and optionally either terephthaloyl chloride, isophthaloyl chloride or mixtures thereof.

BACKGROUND

Permselective membranes suitable for use in desalination of aqueous solutions are the subject of numerous patents. Richter et al. U.S. Pat. No. 3,567,632 discloses membranes made of organic, nitrogen linked aromatic polymers. Cadotte U.S. Pat. No. 4,277,344 discloses permselective multi-layer membranes in which there is a microporous polysulfone substrate layer and a superposed polyamide layer made from an aromatic triacid halide and an aromatic diamine. Scala et al. U.S. Pat. No. 3,744,642 discloses multilayer membranes in which one layer is porous substrate and the juxtaposed layer is a polyamide, a polyphenylester, or a polysulfonamide. Weyland et al. U.S. Pat. No. 3,649,687 discloses the use of 1,3,5-cyclohexane tricarbonyl chloride in the production of crosslinking agent: 1,3,5-cyclohexane triisocyanate. Hara et al. U.S. Pat. No. 4,353,802 discloses semipermeable composite membranes in which the membrane material is crosslinked using polyfunctional aromatic acid halides. More recently U.S. Pat. Nos. 4,520,044 and 4,529,646 disclose permselective multilayer membranes in which there is a microporous polysulfone support and a polyamide layer made from 1,3,5-cyclohexane tricarbonyl chloride.

SUMMARY OF THE INVENTION

The present invention is a multilayer membrane comprising a microporous support layer and a superposed layer of a copolyamide derived from m-phenylene diamine with trimesoyl chloride, cyclohexane-1,3,5-tricarbonyl chloride and optionally either terephthaloyl chloride, isophthaloyl chloride or mixtures thereof.

In a preferred embodiment the microporous substrate is a polysulfone, and the pore size of polysulfone is less than about 20 nanometers in diameter.

Cyclohexane-1,3,5-tricarboxylic acid exists as two geometric isomers: cis and trans (Ref. Alfred Steitz, Jr., J. Organic Chem. 33, 7, 2978-9 (1968)).

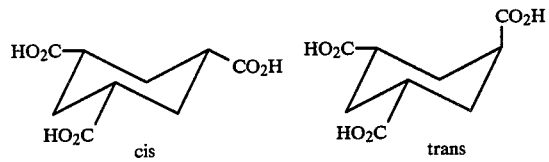

cis        trans

These are two distinct organic compounds, interconvertible only by heating at elevated temperatures for extended periods of time (24 hours), or by appropriate chemical reactions. These two isomeric forms also exist in the corresponding acid chlorides and amides including polyamides.

A convenient method of preparation of the membrane of the invention is by interfacial condensation polymerization, i.e. contacting the polysulfone substrate with a solution of meta-phenylene diamine, and then contacting the polysulfone substrate with a solution of acid chlorides being used. The cyclohexane tricarbonyl chloride used can be the cis form, the trans form or mixtures thereof. This method yields very thin films since the reaction is diffusion controlled and self-limiting.

In the membranes of this invention the microporous substrate will normally be about 0.5 to 5 mils thick, and the copolyamide layer will normally be about 20 to 200 nanometers thick.

DETAILED DESCRIPTION

The procedures of Cadotte U.S. Pat. No. 4,277,344 or Sundet U.S. Pat. Nos. 4,520,044 or 4,529,646 are illustrative of the conditions needed for preparing composite membranes of this type. The process consists essentially of several steps:

A microporous substrate with pores less than 20 nm. in diameter is prepared. This may be accomplished with a polysulfone, cast from a 15% solution thereof in dimethylformamide and immediately quenched in water to precipitate the polysulfone and extract the solvent.

This substrate (dried and stored, or fresh and wet) is then loaded with an aqueous solution of the aromatic diamine at a concentration of 1-10%, preferably 2-4% in the water, and the excess solution removed from the surface by some draining, rolling or sponging procedure. The concentration of the diamine is an important factor in the performance of the resulting composite.

If desired the cast polysulfone can be quenched in an aqueous solution containing 0.1-10% by weight, preferably 0.5-5% by weight and most preferably 1-3% by weight aromatic diamine. This technique often produces a composite membrane superior to that obtained using the two step aqueous quench followed by loading with diamine process described above.

The loaded substrate is then immersed in a solution of the mixed acid chlorides in Freon ® TF chlorofluorocarbon liquid or hexane or mixtures thereof (solvents which do not adversely affect the porous structure of the polysulfone substrate) for 5-90, preferably 15-35 secs. at room temperature. Formation of the polyamide causes the originally shiny substrate to have a dull finish. The original cis/trans geometric ratio of the starting cyclohexane tricarbonyl chloride monomer is believed to be retained in the final polyamide.

The resulting composite is then dried at temperatures of 20°-100° C., preferably 50°-70° C., for periods of 5-180 secs., preferably 15-60 secs., to establish adhesion of the surface polyamide to the polysulfone substrate.

The residual diamine and reaction byproducts are extracted by soaking in water.

The present invention relates to the discovery that the flux of a membrane can be improved while still retaining good salt passage by using a copolymer of m-phenylene diamine with 10 to 85 wt. % preferably 15 to 40 wt. % (based on polyfunctional acid present) of trimesoyl chloride, 90 to 20 wt. %, preferably 85 to 60 wt. % (based on polyfunctional acid present) of cyclohexane-1,3,5-tricarbonyl chloride and up to 40 wt. % (based on polyfunctional acid present) of terephthaloyl chloride, isophthaloyl chloride or mixtures thereof. The best (lowest) salt passage/Kw ratios are obtained in the region of 10 to 40 wt. % (based on polyfunctional acid) trimesoyl chloride, 50 to 80 wt. % (based on polyfunctional acid) cyclohexane-1,3,5-tricarbonyl chloride and 10 to 30 wt. % (based on polyfunctional acid) isophthaloyl chloride and/or terephthaloyl chloride). By varying the processing conditions membranes can be produced which have improved flux and adequately low salt passage for desalinating sea water or membranes with higher salt passages can be produced for desalinating brackish water with very high fluxes.

EXAMPLES

EXAMPLE 1

A statistically-designed series of membranes was prepared and tested to cover the composition ranges of 20–90% cyclohexane-1,3,5-tricarbonyl chloride (HTCl) and 10–80% trimesoyl chloride (TMesCl). The preparative procedure involved the following steps:

(1) preparation of the microporous substrate by
  (a) casting a solution of 15% polysulfone derived from bisphenol A and p,p'-dichlorophenol having a molecular weight of about 35,000, 0.2% Gafac RE610, a complex organic phosphate ester, and a 0.3% water in dimethylformamide on a glass plate with a Gardner knife set at six mils ($1.5 \times 10^{-4}$m);
  (b) after ten seconds quenching this casting in an aqueous solution of 5% dimethyl formamide and 1.3% m-phenylene diamine at room temperature for one minute;
  (c) extracting this micorporous polysulfone substrate for four minutes in 1.3% aqueous m-phenylene diamine, and
  (d) stripping surface droplets of aqueous m-phenylene diamine from the surface of the polysulfone with a soft rubber roller;

(2) reaction of this substrate with the acid chlorides by:
  (a) immersion in a 0.1% solution of the mixed acid chlorides (as indicated in the table) in 1,2,2-trichloro-1,1,2-trifluoroethane for ten seconds, draining, and
  (b) drying the composite membrane at 20°–23° C. for thirty minutes; and (3) extraction of the resulting composite by:
  (a) immersion in water at 57° C. for five minutes;
  (b) storage in deionized water for 10–14 days; and
  (c) treatment with 15% ethanol at 75–80 psi in the test cell for one hour, then rinsing with deionized water before testing.

The membranes were tested with NaCl solution at 2.0–2.1 g/l and pressures of 225 and 420 psi (1.5 and 2.75 MPa). Initial tests were obtained after 5–7 hours at 420 psi (2.75 MPa), then final tests (reported in the table were made after additional 17 hours at 225 psi (1.5 MPa). The tests reported in the table were done at 420 psi (2.75 MPa).

TABLE I

| Run | HTCl % w/v | I/TCl % w/v | TMesCl % w/v | Salt Passage % | Kw m/s/TPa |
|-----|-----------|-------------|--------------|----------------|------------|
| A | 0.09 | — | 0.01 | 3.58 | 11.28 |
| B | 0.05 | — | 0.05 | 2.52 | 13.09 |
| C | 0.04 | 0.03 | 0.03 | 3.04 | 10.24 |
| D | 0.02 | 0.05 | 0.03 | 1.79 | 9.10 |
| E | 0.02 | — | 0.08 | 1.63 | 11.30 |
| F | 0.05 | 0.02 | 0.03 | 4.37 | 12.11 |
| G | 0.05 | — | 0.05 | 2.34 | 13.11 |
| H | 0.04 | 0.02 | 0.04 | 2.08 | 10.91 |
|   |      |      |      | 1.58 | 10.24 |
| I | 0.05 | 0.02 | 0.03 | 4.69 | 13.07 |
| K | 0.05 | 0.01 | 0.04 | 3.10 | 13.63 |
| L | 0.05 | — | 0.05 | 2.29 | 11.29 |
| M | 0.06 | 0.02 | 0.02 | 2.26 | 12.59 |
|   |      |      |      | 3.18 | 12.12 |
| N | 0.06 | 0.01 | 0.03 | 2.72 | 14.87 |
| O | 0.06 |      | 0.04 | 2.22 | 14.88 |
| P | 0.07 | — | 0.03 | 2.40 | 11.28 |
|   |      |      |      | 3.20 | 10.23 |

I claim:

1. A composite reverse osmosis membrane having good salt rejection with high flux comprising a microporous support layer and superposed thereon a layer of an interfacially polymerized copolyamide consisting essentially of repeating units derived from meta-phenylene diamine and, based on polymerized acid chloride present, from 10 to 80 weight percent of the repeating units derived from trimesoyl chloride, 90 to 15 weight percent repeating units derived from cyclohexane-1,3,5-tricarbonyl chloride and, up to 40 weight percent of the repeating units are derived from isophthaloyl chloride, terephthaloyl chloride or mixtures thereof.

2. The reverse osmosis membrane of claim 1, wherein based on polymerized acid chloride present, from 15 to 40 weight percent of the repeating units are derived from trimesoyl chloride, and from 85 to 60 weight percent of the repeating units are derived from cyclohexane-1,3,5-tricarbonyl chloride.

3. The reverse osmosis membrane of claim 1 wherein, based on polymerized acid chloride present, from 10 to 40 weight percent of the repeating units are derived from trimesoyl chloride, 50 to 80 weight percent of the repeating units are derived from cyclohexane-1,3,5-tricarbonyl chloride and from 10 to 30 weight percent of the repeating units are derived from isophthaloyl chloride which may be in admixture with terephthaloyl chloride.

* * * * *